United States Patent
Miller et al.

(10) Patent No.: US 8,210,482 B2
(45) Date of Patent: Jul. 3, 2012

(54) PRISMATIC-SHAPED VORTEX GENERATORS

(75) Inventors: Daniel N. Miller, Bainbridge Island, WA (US); Dan J. Baruzzini, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 317 days.

(21) Appl. No.: 12/606,811

(22) Filed: Oct. 27, 2009

(65) Prior Publication Data

US 2011/0095135 A1    Apr. 28, 2011

(51) Int. Cl.
*B64C 9/00* (2006.01)
(52) U.S. Cl. ............ 244/200.1; 244/199; 244/200; 244/130
(58) Field of Classification Search ............ 244/200.1
See application file for complete search history.

(56) References Cited

U.S. PATENT DOCUMENTS

| | | | |
|---|---|---|---|
| 4,323,209 A * | 4/1982 | Thompson | 244/199.1 |
| 4,354,648 A * | 10/1982 | Schenk et al. | 244/200.1 |
| 4,706,910 A | 11/1987 | Walsh et al. | |
| 4,750,693 A | 6/1988 | Lobert et al. | |
| 5,171,623 A | 12/1992 | Yee | |
| 5,386,955 A | 2/1995 | Savill | |
| 5,540,406 A | 7/1996 | Occhipinti | |
| 5,598,990 A * | 2/1997 | Farokhi et al. | 244/200.1 |
| 6,471,157 B1 | 10/2002 | Streett et al. | |
| 7,413,262 B2 | 8/2008 | Ording et al. | |
| 2008/0061192 A1 | 3/2008 | Sullivan | |
| 2008/0265100 A1 | 10/2008 | Crouch et al. | |
| 2010/0154423 A1* | 6/2010 | Olausson et al. | 60/725 |
| 2011/0210211 A1* | 9/2011 | Zha et al. | 244/208 |

* cited by examiner

*Primary Examiner* — Joshua J Michener
*Assistant Examiner* — Medhat Badawi
(74) *Attorney, Agent, or Firm* — Bracewell & Giuliani LLP

(57) ABSTRACT

A prismatic vortex generator for attenuating flow separation which occurs during supersonic flow of air over structure such as an aircraft airfoil, its fuselage, surfaces forming a part of a jet engine inlet, or similar surfaces subjected to supersonic airflow. A series of prismatic vortex generators are provided, each of which is configured to generate a vortex which attenuates flow separation and weight drag resulting from the supersonic airflow. Each prismatic vortex generator has a prismatic shape with a base, leading and trailing ends, and sidewalls that incline toward and join each other to form an apex. The leading end of each prismatic vortex generators is inclined away from the direction of flow.

19 Claims, 5 Drawing Sheets

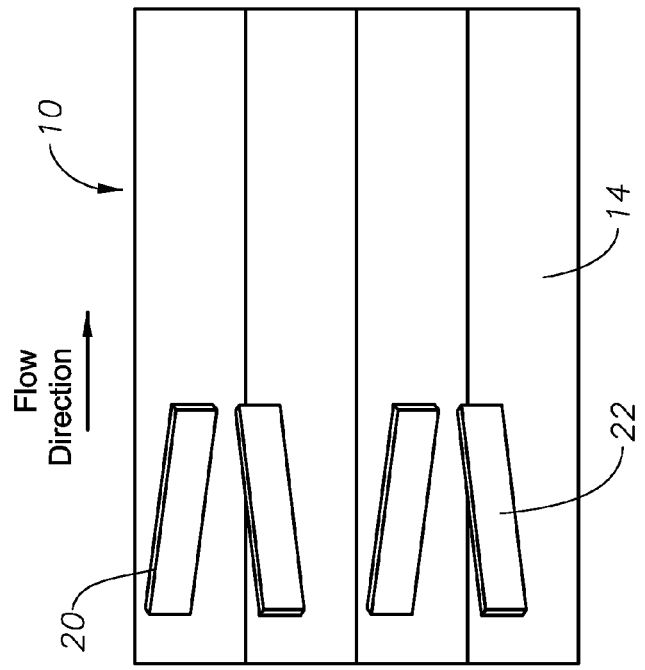
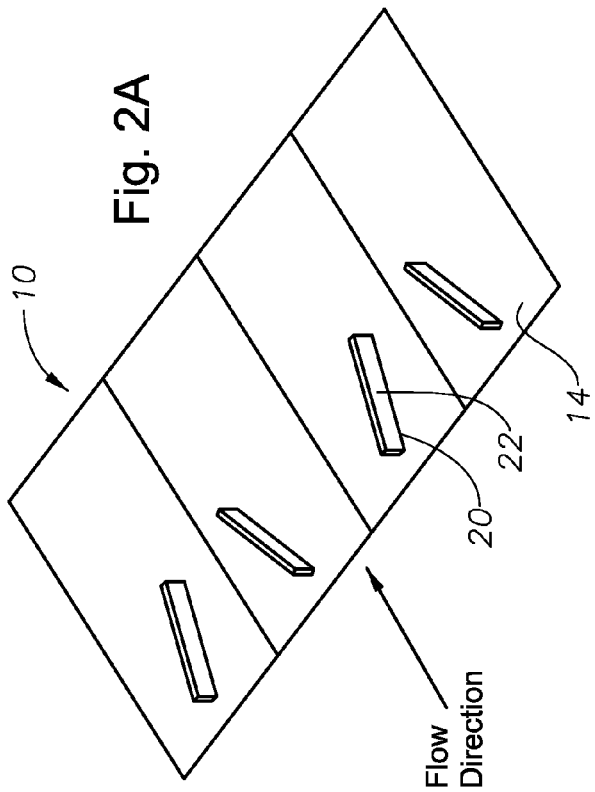
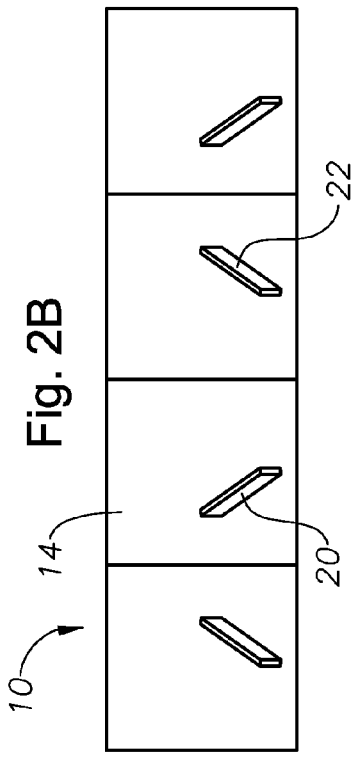

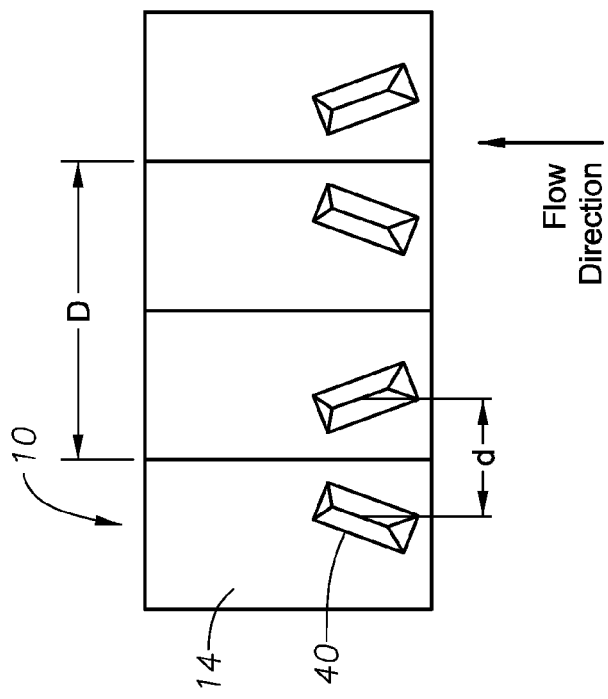
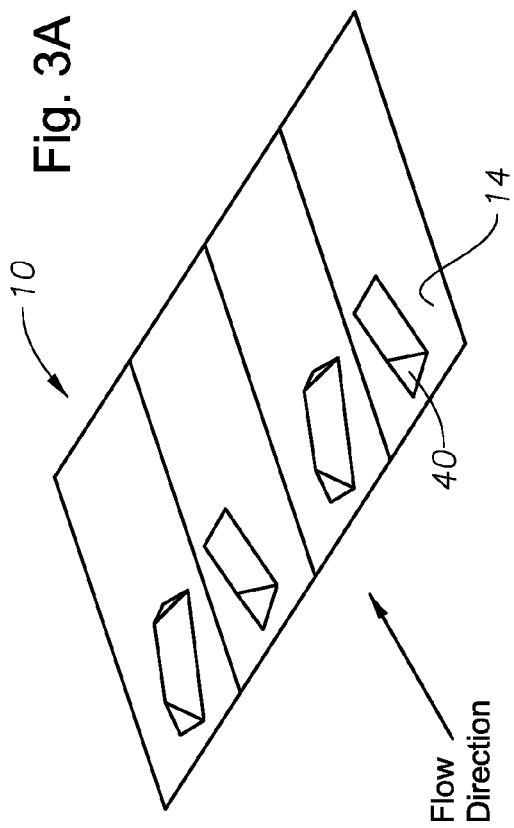
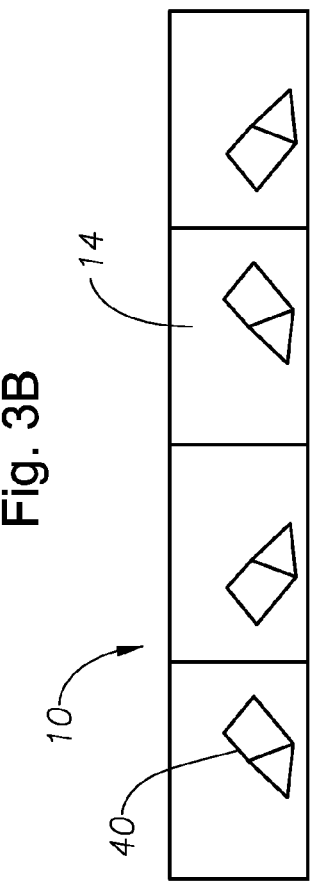

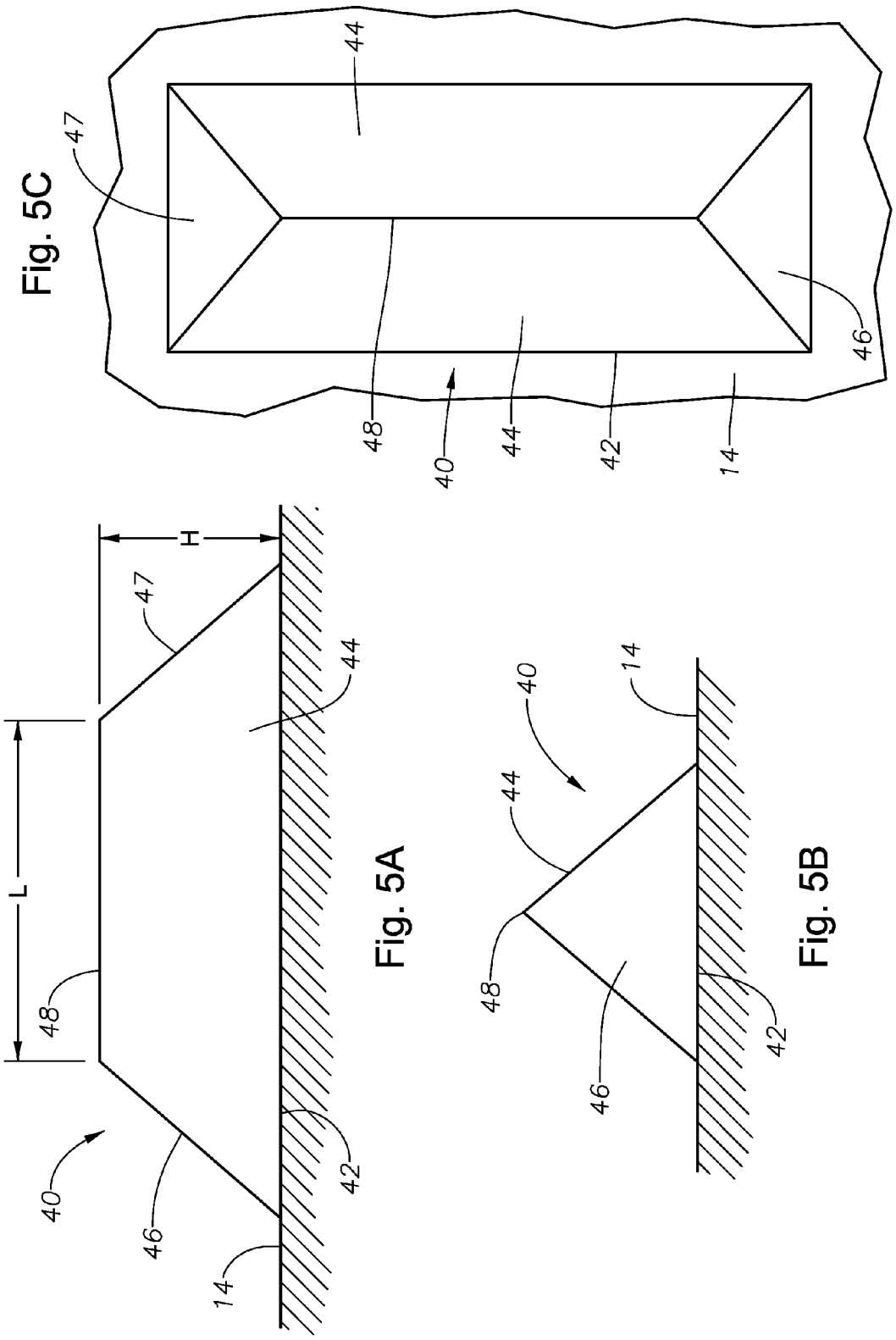

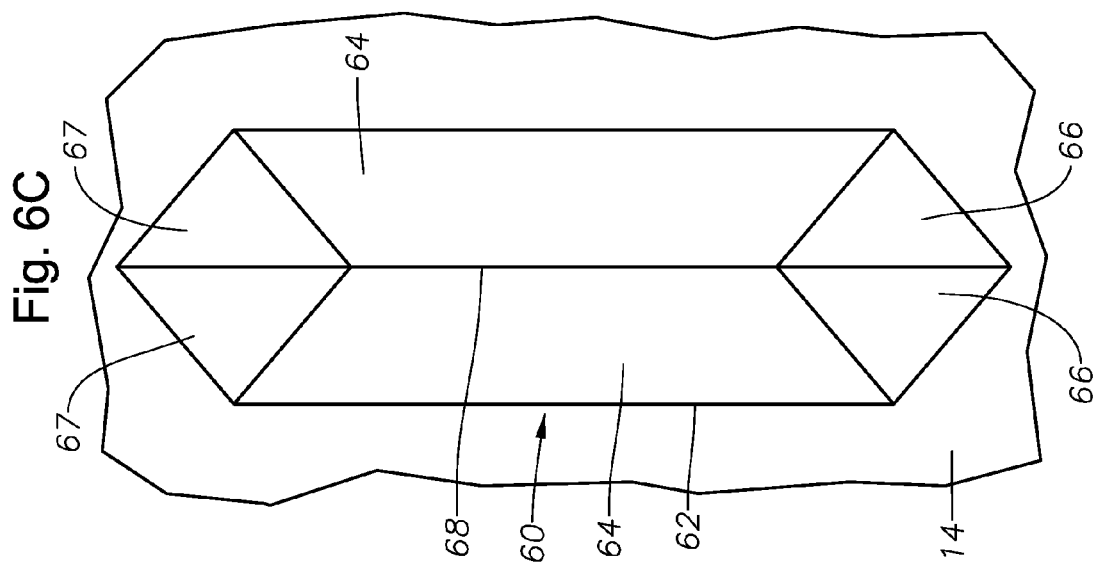
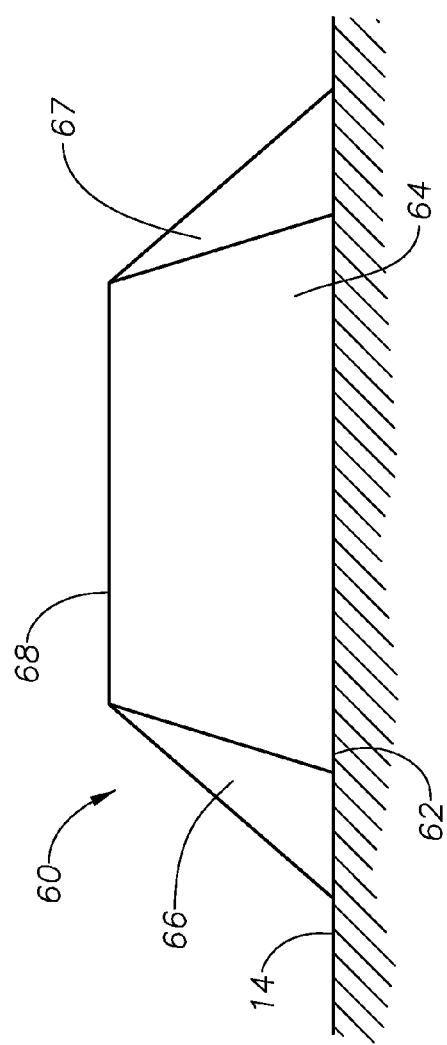
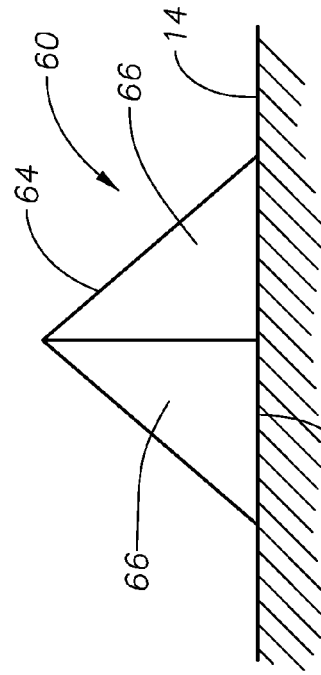

PRISMATIC-SHAPED VORTEX GENERATORS

FIELD OF THE INVENTION

The present invention relates in general to vortex generators for supersonic aircraft and, in particular, to increasing the robustness of vortex generators for maintaining an attached boundary layer in supersonic aircraft inlet engine applications.

BACKGROUND OF THE INVENTION

Supersonic airflow over components such as the internal portion of aircraft engine inlets and aircraft airfoils, can generate shock waves. These shock waves oscillate back and forth and causes the air flow to separate from the surface within engine inlets or on airfoils. Flow separation on airfoils can result in loss of lift and can ultimately cause a stall. Further, these shock waves can cause increased drag and buffeting of control surfaces attached to the trailing edge of the wing. Similar separation conditions can also occur at engine inlets, and other areas of the aircraft.

One approach to preventing or attenuating flow separation is through the introduction of vortices in the boundary layer or sub-boundary layer region. Vortex generators that project from the surface of the engine inlet or airfoil in supersonic airflow applications can thus be utilized to prevent or attenuate flow separation. The vortex generators proposed previously for supersonic engine inlets primarily consist of a plurality of short (smaller than the boundary layer height), thin rectangular blades (or microvanes) located downstream of the leading edge of the engine inlet and upstream of the point on the surface within the engine inlet where flow separation would occur without the vortex generator.

In a typical supersonic application, the blades are generally aligned with the path of air or at an acute angle with respect to the line of flight. Vortices that form off the tips of the blades can draw air down from the upper region of the boundary layer down toward the near-wall region to attenuate flow separation and reduce unwanted aerodynamic phenomena associated with flow separation, such as drag, aerodynamic blockage, and shock dithering. However, rectangular vortex generators are deficient for practical applications when considering needs for reliability, maintainability, and survivability particularly in engine inlets. Thin, rectangular vortex generators lack the robustness to survive the harsh pressure and aerodynamic loads, and heat erosion. The thin, rectangular vortex generators also do not tolerate damage due to debris that may impact the vortex generator. Furthermore, rectangular microvanes have been historically difficult to incorporate into a producible manufacturing process.

While current state-of-the-art vortex generator designs and integration approaches are feasible for attenuating flow separation in supersonic applications, an improved solution would be desirable to increase the robustness of vortex generators.

SUMMARY OF THE INVENTION

One embodiment for a vortex generating system for preventing flow separation in supersonic airflow over a surface comprises a plurality of prismatic-shaped vortex generators or structures attached to the airflow surface. These new vortex generators are also referred to as prismatic-shaped passive flow control devices. The general shape of these passive flow control devices in one embodiment is prismatic, having a triangular longitudinal cross-section, trapezoidal side view, and rectangular base. Other embodiments of passive flow control devices can have a hexangular base. The present invention addresses the problems described above in the background.

The prismatic vortex generators can be located on a surface inside an aircraft engine inlet and located in a region downstream of the engine inlet intake. The prismatic vortex generators are further located upstream on the surface where flow separation would occur without the prismatic vortex generator. The vortices generated by the prismatic vortex generators draw air down from the upper region of the boundary layer down toward the near-wall region to attenuate flow separation that can negatively affect engine performance.

Depending on the application, the prismatic vortex generators can be oriented such that they are at an angle with respect to the direction of flow. The spacing between the prismatic vortex generators can also vary by application.

The prismatic shape of the vortex generators makes them more robust to thus advantageously increase their reliability, maintainability, and survivability. In this embodiment, the inclined or slanted triangular faces at each end of a prismatic vortex generator allow the prismatic vortex generator to be more resistant to harsh pressure and aerodynamic loads, and erosion due to heat. In this embodiment, a pair of side walls join the inclined triangular faces. The sidewalls, like the triangular faces, are inclined such that they meet to form an apex that runs from the apex of one triangular face to the other. Each of the sidewalls in this example thus has a trapezoidal shape. The faces and sidewalls are joined at the bottom by a base. The inclined triangular faces and inclined sidewalls allow the prismatic vortex generator to better tolerate impact from debris by allowing debris to deflect of the inclined surfaces rather than experience a direct impact.

The features of prismatic-shaped vortex generators thus provide several improvements for vortex generators. Use of the prismatic vortex generators is not restricted to the engine inlet supersonic aircraft as they may be used on other supersonic airflow surfaces such as a wing structure, fuselage, or the tail airfoils of an aircraft, or other structures subjected to supersonic airflow such as turbine or compressor blades or the like. Other applications of prismatic vortex generators include improving the health of the boundary layer, mitigating the growth of undesired vortices, stabilizing the position of oblique and normal shockwaves, and enhancing mixing between multiple streams or regions of flow.

BRIEF DESCRIPTION OF THE DRAWINGS

FIGS. 2A-2C show isometric, forward looking aft, and top views of the prior art rectangular vortex generators;

FIGS. 3A-3C show isometric, forward looking aft, and top views of one embodiment of an aircraft engine inlet with prismatic-shaped vortex generators, constructed in accordance with the present invention;

FIGS. 5A-5C show schematic side, front and top views of an individual prismatic-shaped vortex generator of an embodiment constructed in accordance with the present invention;

FIGS. 6A-6C show schematic side, front and top views of an individual prismatic-shaped vortex generator of an embodiment constructed in accordance with the present invention.

DETAILED DESCRIPTION OF THE INVENTION

Figure 1:
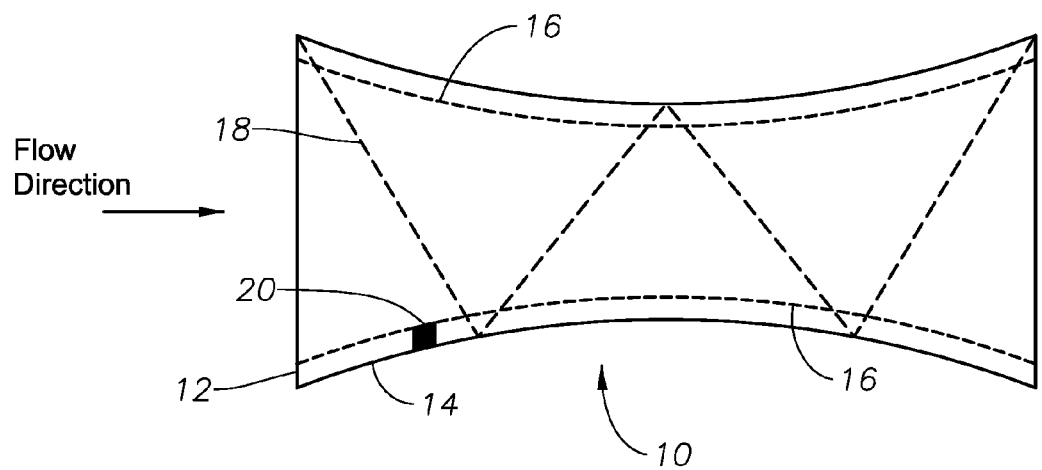
FIG. 1 is a sectional side view of a conventional, aircraft engine inlet equipped with a conventional rectangular vortex generator.

FIG. 1 shows a conventional engine inlet or duct 10 with an inner surface 14 over which air can flow. A boundary layer 16 with a measurable thickness develops over the surface 14 as air flows over the surface 14. When air flows over the surface 14 at supersonic speeds, shock waves 18 can be generated. The shock waves 18 oscillate back and forth inside the engine inlet 10 and can cause the boundary layer 16 to separate from the surface 14 of the engine inlets 10. To attenuate this flow separation of the boundary layer, a conventional rectangular vortex generator 20 can be located on the surface 14. The rectangular vortex generator 20 creates vortices than can help prevent flow separation.

As illustrated in FIGS. 2A-2C, a series of conventional, rectangular vortex generators 20 can be located on the surface 14 and can be oriented at an angle relative to the direction of air flow. Although, this conventional arrangement of rectangular vortex generators may attenuate flow separation at supersonic conditions, the rectangular vortex generators 20 are not robust enough for the reliability, maintainability, and survivability desired as the rectangular faces 22 of the vortex generators 20 do not effectively tolerate the harsh pressure and aerodynamic loads, heat erosion, debris impact nor are these devices producible with standard manufacturing processes.

Referring to FIGS. 3A-3C an embodiment of a vortex generating system is shown comprising prismatic-shaped vortex generators or structures 40 attached to the surface 14 of the engine inlet 10. In this embodiment, the prismatic-shaped vortex generators 40 are shown spaced apart and with an orientation such that the prismatic vortex generators 40 are at an angle relative to the direction of air flow, i.e. angle of attack "AoA". Both the spacing and angle of attack is dependant on the application. In this embodiment, the spacing can be determined by the ratio between a distance "D" between a pair of prismatic vortex generators 40 and a distance "d" between the individual generators that form a pair. The ratio of D/d is preferably 2 but can vary in a range between 1.5 and 2.5. The AoA of a prismatic vortex generators 40 is preferably 20 degrees but can vary between 16 and 24 degrees.

Figure 4:
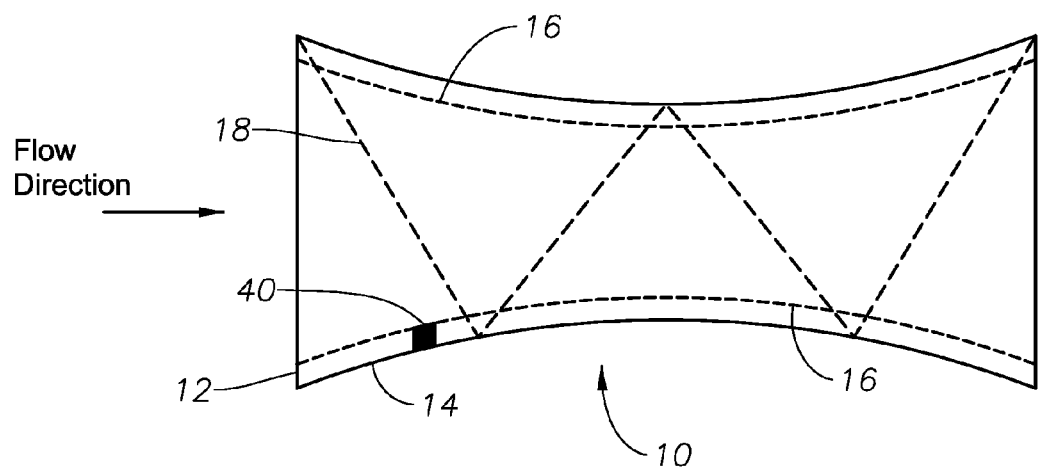
FIG. 4 is a sectional side view showing the location of the prismatic-shaped vortex generator within an aircraft engine inlet, constructed in accordance with the present invention.

In this embodiment, the prismatic-shaped vortex generators 40 can be located within an engine inlet 10 and located in a region downstream of the engine inlet 10 intake, but upstream from the throat or minimum cross-sectional flow area, as shown in FIG. 4. FIG. 4 further shows the prismatic-shaped vortex generators 40 located upstream on the surface where flow separation would occur without the vortex generator. This streamwise location is preferably located in the range of 8 to 10 times the thickness of the boundary layer 16 upstream of the shockwave intersection with the boundary layer edge. Vortices generated by the prismatic vortex generators 40 draw air down from the upper region of the boundary layer 16 down toward the near-wall region of the airflow surface 14 to help prevent and attenuate flow separation that can occur due to shock waves 18 generated during supersonic air flow, thus helping prevent negative effects on engine performance.

Referring to FIGS. 5A-5C, the geometry of a prismatic-shaped vortex generator 40 is shown in more detail. In this embodiment, the prismatic-shaped vortex generator 40 comprises a base 42 having a rectangular shape, and inclined polygonally-shaped sidewalls 44 joined at their ends by inclined polygonally-shaped ends 46 and 47. The prismatic vortex generator 40 may be fabricated from a single piece of suitable material or multiple pieces joined or fastened together. The base 42 allows for attachment or fastening of the prismatic vortex generator 40 to the surface 14 of the engine inlet 10 (FIG. 4). The base 42 preferably has a width of 1.5 times the height "H" of the prismatic vortex generator 40 but can vary between 1 to 2 times the height H. The inclined or slanted ends 46, 47 in this example are flat and incline toward each other. The inclined ends 46, 47 are preferably inclined 45 degrees from a vertical axis but the incline can range from 30 to 60 degrees. The upstream or leading end 46 slants in a downstream direction from base 42. The downstream or trailing end 47 slants in an upstream direction from base 42. Preferably ends 46, 47 are triangular in shape as shown in FIG. 5B. However, other shapes for the ends 46, 47 such as trapezoidal can be utilized. The sidewalls 44 are flat and have a trapezoidal shape in this embodiment and like the triangular ends 46, 47, are inclined relative to base 42. Sidewalls 44 meet each other to form an apex 48 that runs from the apex of one triangular end 46 to the other end 47, as best shown in FIG. 5C. The inclined triangular ends 46, 47 and inclined sidewalls 44 allow the prismatic vortex generator 40 to better tolerate impact from debris by allowing debris to deflect of the inclined surfaces rather than experience a direct impact as well as better tolerate erosion due to viscous heating.

The height H of the prismatic-shaped vortex generator 40 from base 42 to apex 48 is preferably in the range of ⅕ to ¼ the thickness of the boundary layer 16 but can vary between ⅕ to ½ the thickness of the boundary layer 16 (FIG. 4). The height H remains constant from leading to trailing end 46. Heights larger than ½ the thickness of the boundary layer may be undesirable as they can create undesirable increases in drag. The length "L" of the apex is preferably 8 times the height H but can vary between four and 12 times the height H depending on the application and the strength of the vortices required. The width of base 42 is shown to approximately be the same as the dimension of each sidewall 44 from base 42 to apex 48. The shape in an end view as in FIG. 5B is thus that of a triangle. However, the width of base 42 may differ from the dimensions of sidewalls 44 from base 42 to apex 48.

In other embodiments, the prismatic-shaped vortex generators 40 could be disposed circumferentially spaced apart inside the engine inlet 10. Thus, flow separation could be attenuated in all interior surfaces.

In another embodiment, the prismatic-shaped vortex generators 40 could be located on an external surface such as the wing of an aircraft to prevent flow separation on the wing at supersonic speeds.

In yet another embodiment, the faces 46 of the prismatic-shaped vortex generators 40 have a trapezoidal shape. In this embodiment, a flat top plate (not shown) would join the ends 46, 47 and sidewalls 44 to create a flat crest rather than a sharp apex 48.

In another embodiment shown in FIGS. 6A-6C, a prismatic vortex generator 60 comprises a base 62 having a hexangular shape, and inclined polygonally-shaped sidewalls 64 joined at their ends by inclined polygonally-shaped ends 66 and 67. Ends 66 and 67 are each comprised of two triangle-shaped sections having a side that coincides and form an end of an apex 68. The two triangle-shaped sections making up the upstream or leading end 66 face away from each other and slant in a downstream direction from base 62 and also slant toward. The two triangle-shaped sections making up the downstream or trailing end 67 also face away from each other and slant in an upstream direction from base 62. Sidewalls 64 meet each other to form an apex 68 that runs from the apex of one end 66 to the other end 67, as best shown in FIG. 6C.

The invention has many advantages, including preventing boundary layer separation for supersonic applications and increasing the robustness of vortex generators to thus increase reliability, maintainability, and survivability of the vortex generator. It also provides increased resistance to heat erosion and debris impact. All of these advantages are provided simultaneously with a single device that is relatively easy to produce and adapt for use in air inlets.

While the invention has been shown or described in only some of its forms, it should be apparent to those skilled in the art that it is not so limited, but is susceptible to various changes without departing from the scope of the invention.

The invention claimed is:

1. A plurality of vortex generators for mounting to an aircraft, each of the vortex generators comprising:
    a base for attachment to the aircraft;
    sidewalls that join opposite edges of the base wherein each one of sidewalls is in a plane distinct from the plane of the other sidewall, and each one of said planes is inclined toward each other relative to the base;
    a leading end that joins the base wherein the leading end is in a plane that inclines from the base in a trailing direction;
    a trailing end that joins the base and the sidewalls wherein the trailing end is in a plane that inclines from the base in a leading direction; and wherein
    adjacent ones of the vortex generators form a pair with a converging distance between them from the leading ends to the trailing ends.

2. The vortex generators according to claim 1, wherein the leading end of each of the vortex generators is triangular in shape.

3. The vortex generators according to claim 1, wherein the trailing end of each of the vortex generators is triangular in shape.

4. The vortex generators according to claim 1, wherein the sidewalls of each of the vortex generators join each other to define an apex.

5. The vortex generators according to claim 1, wherein a height of each of the vortex generators from the base to upper edges of the sidewalls is in a range between ⅕ the thickness of a boundary layer to ½ the thickness of a boundary layer.

6. The vortex generators according to claim 1, wherein a length of the base from the leading end to the trailing end of each of the vortex generators is in a range between 4 and 12 times a height of each of the vortex generators.

7. The vortex generators according to claim 1, wherein the base of each of the vortex generators has a rectangular perimeter.

8. The vortex generators according to claim 1, wherein a width of the base of each of the vortex generators is in a range between 1 and 2 times a height of each of the vortex generators.

9. In an aircraft having a surface exposed to supersonic airflow, the improvement comprising:
    a pair of vortex generators attached to and projecting above the surface of the aircraft; and
    wherein each of the vortex generators has a prismatic shape comprising:
        a base attached to the aircraft;
        sidewalls that join opposite edges of the base, wherein each one of sidewalls is in a plane distinct from the plane of the other sidewall, and each one of said planes is inclined toward each other relative to the base;
        a leading end that joins the base wherein the leading end is in a plane that inclines from the base in a trailing direction;
        a trailing end that joins the base and the sidewalls wherein the trailing end is in a plane that inclines from the base in a leading direction; and wherein
        the vortex generators within the pair having a converging distance between them from the leading ends to the trailing ends.

10. The aircraft according to claim 9, wherein a height of each of the vortex generators is in a range between ⅕ the thickness of a boundary layer to ½ the thickness of a boundary layer.

11. The aircraft according to claim 9, wherein a length of each of the vortex generators is in a range between 4 and 12 times a height of each of the vortex generators.

12. The aircraft according to claim 9, wherein the prismatic shape comprises a triangular prismatic shape.

13. The aircraft according to claim 9, wherein a longitudinal axis of each of the vortex generators is oriented at an acute angle relative to the direction of flow of the supersonic airflow.

14. The aircraft according to claim 9, wherein the sidewalls of each of the vortex generators join each other to define an apex.

15. The aircraft according to claim 9, wherein the base of each of the vortex generators has a width in a range between 1 and 2 times a height of each of the vortex generators.

16. In an aircraft having a supersonic inlet for an engine, the improvement, comprising:
    a plurality of vortex generators attached to and projecting from a surface within the inlet, each of the vortex generators comprising:
    a rectangular or hexagonal base in contact with the surface of the inlet;
    a triangular leading end that joins a leading edge of the base and is in a plane that inclines from the base in a trailing direction;
    a triangular trailing end that joins a trailing edge of the base and is in a plane that inclines from the base in a leading direction;
    trapezoidal sidewalls joining the base and the leading and trailing ends, each of the sidewalls being in a plane distinct from the plane containing the other sidewall, the sidewalls inclining toward and joining each other to define an apex ending between the leading and trailing ends; and wherein
    adjacent ones of the vortex generators form a pair, the vortex generators of said pair having a converging distance between them from the leading ends to the trailing ends.

17. The aircraft according to claim 16, wherein a height of each of the vortex generators from the base to the apex is in a range between ⅕ the thickness of a boundary layer to ½ the thickness of a boundary layer.

18. The aircraft according to claim 16, wherein a length of each of the vortex generators from the leading to the trailing edges of the base is in a range between 4 and 12 times a height of the vortex generator.

19. The aircraft according to claim 16, wherein a width of the rectangular or hexagonal base of each of the vortex generators is in a range between 1 and 2 times a height of the vortex generator.

* * * * *